3,415,976
ARC WELDING ELECTRODE
De Witt C. Smith, Greendale, Wis., assignor to Harnischfeger Corporation, Milwaukee, Wis., a corporation of Wisconsin
No Drawing. Filed July 27, 1966, Ser. No. 568,707
3 Claims. (Cl. 219—146)

ABSTRACT OF THE DISCLOSURE

A self-shielded, flux cored electrode containing aluminum, magnesium, calcium, silicon, calcium fluoride, rutile, electrolytic manganese, calcium carbonate, nickel and iron in certain proportions, to produce a finished weld with a minimum of deoxidizing and denitriding elements.

---

This invention relates to an improved arc welding electrode of the flux core type which can be used without any protective coating on the outside of the electrode or gas shielding supplied to the arc independently of the electrode.

Conventional open arc-welding electrodes contain relatively large amounts of deoxidizers such as aluminum, magnesium, silicon, manganese, and titanium which remove oxides as they form in the weld metal and they then float to the surface of the molten pool of weld metal as slag. Nitrogen absorbing ingredients such as titanium, zirconium, and some of the rare earth elements may also be used to lower the nitride content of the weld metal resulting in low impact resistance at low temperature. Since the elements of titanium, zirconium, and some of the rare earth elements absorb nitrogen to some degree, their amount must be so accurately controlled that it becomes impracticable for control in commercial production.

Other conventional manual arc-welding electrodes are coated on the outside of a core wire with ingredients that decompose due to the heat of the electric arc, and form a shielding atmosphere to prevent the oxygen and nitrogen of the air from contaminating the molten metal. This coating also contains fluxing agents which act as scavengers to cleanse the molten metal for small amounts of oxides and nitrides.

In regard to the above two types, if the same proportion of ingredients are used in the core of the open arc type electrode that are used in the manual type electrode, the arc action is very erratic and the spatter quite pronounced, making them unsuitable for welding.

Conventional flux cored wires designed for use with auxiliary shielding gas, such as carbon dioxide, argon, or helium, contain little, if any, gas forming ingredients but instead primarily use slag forming materials which serve as scavengers to cleanse the weld metal from small amounts of oxides and/or nitrides, and the gases from the auxiliary shielding protect the arc from the atmosphere.

The present invention provides both shielding and weld metal cleansing with an open arc which requires no independent, external shielding gas; the improved electrode utilizes an effective deoxidizing and de-nitriding means, together with the maximum amount of gas producing ingredients which can be used without producing undesirable spatter or erratic arc action. A more specific aspect of the invention relates to such an electrode in which the slag produced is a basic or neutral pH as contrasted with the conventional acid type slags produced with conventional $CO_2$ shielded flux-cored electrodes.

The present invention provides an improved flux-core electrode of the type mentioned immediately above, by utilizing ingredients which form a basic or approximately neutral slag, together with the proper amount of deoxidizers to kill the molten metal and cleanse it from oxides and nitrides without leaving an excess to contaminate in the weld metal. Furthermore, alloys are utilized which reduce the solubility of nitrides and carbides in the weld metal, and thus lower the hardness or tensile strength and increase the resistance to low temperature impact.

Another important aspect of the present invention relates to the use of nickel in the ingredients of the electrode which functions in an unusual, unexpected and somewhat explainable manner to reduce the nitride content to a minimum. It is desirable in this type of welding to minimize nitride content because it forms harmful iron nitrides which contribute to brittleness. Heretofore in this art it has been considered exceptionally satisfactory to be able to hold the nitride content to 0.04 percent. With the present invention, the nitride content has been held to 0.02 percent. This is accomplished by the use of nickel in the ingredients, which is believed to serve as a catalyst in reducing the solubility of nitrogen and other strength raisers in the weld metal which contributes to the tensile and yield strength of the weld. Nickel itself is a ferrite strengthener and its use in steel or weld metal normally results in an increase in ultimate and yield strength. In the present invention however, it functions in an unusual manner in that it reduces solubility of the nitrogen and it reduces the ultimate and yield strength of the weld metal and increases ductility; it also increases the low temperature impact resistance.

Generally, the present invention provides an improved electrode of the flux core type which (1) results in maximum cleansing action of the weld metal from harmful contaminants of oxygen and nitrogen compounds, (2) produces a heavy, protective slag which is easily removed, (3) requires no independent external gas shielding, (4) results in weld metal of lower hardness or tensile strength and higher ductility and resistance to low temperature impact, and (5) transfers the metal in a particularly efficient manner so that a minimum area of the metal is exposed to oxygen and nitrogen.

These and other objects and advantages of the present invention will appear as this disclosure progresses.

In accordance with the present invention, there is provided an arc welding electrode comprised of a hollow tube of metal which constitutes part of the electrode metal and contains the flux. The electrode metal to be deposited may be an alloy of steel, and is often of plain low carbon steel of the cheapest variety. Inasmuch as a flux core electrode per se is well known in the art, a drawing of such an electrode is not believed to be necessary for purposes of this disclosure. It is believed sufficient to say that the tube may be formed as a single piece or with its longitudinal edges either overlapping or formed as a butt joint. Furthermore, the edges need not be welded together but they may be, if desired. The flux material may be deposited in the tube either in powder form or as a paste which is conventionally deposited into a partially formed U-shaped tube, the tube then being closed by subsequent operations.

The various ingredients which comprise the flux will first be expressed in a percentage weight of the total weight of the ingredients. The total electrode metal may consist of the tube itself as well as some iron powder in the tube. Thus the total weight of the ingredients may vary, depending on how much of the electrode metal is in the form of iron powder or in the form of the tube. Generally, I have found it preferable to use at least 30% by weight of iron powder as compared to the weight of the total ingredients, and this iron powder weight usually varies from 45 to 55% of the total ingredient weight. As indicated, the following percentages are of the total ingredient weight when the iron powder constitutes about 50% of the total ingredient weight.

According to the present invention, the ingredients include aluminum and magnesium which are combined in approximately equal parts and I have found that the percentage of approximately 2.3 percent of aluminum and magnesium combined provided very good results. This percentage may go as high as 4.5 percent and also obtain good results. It is possible to use either aluminum or magnesium by itself but when this is done they become very reactive. Therefore, the combination of aluminum and magnesium in approximately a 50–50 ratio is preferable and with a total weight of 2.3 to 4.5% is preferable.

A calcium-silicon mixture is also added to the ingredients, the silicon comprising approximately 60 percent while calcium comprises 30 percent of the calcium-silicon mixture and the balance is impurities, such as for example, iron and other ingredients. The total amount of calcium plus silicon in my preferred ingredients is in the neighborhood of 2.5 to 4.0 percent of the weight of the ingredients. The calcium in the calcium-silicon mixture contributes to the basic pH factor of the slag.

Calcium fluoride in the amount of 15 to 20 percent is also used and this constitutes the slag former which controls the wetting action or fluidity of the weld metal, i.e., it functions as a fluxing agent.

Rutile is also used and in an amount of about 15 to 20 percent. This is also a slag former primarily and it serves to form titanium in the weld metal which serves as a nitrogen absorber.

The above ratio of calcium fluoride and rutile above indicated gives good slag properties in the resulting weld.

The ingredients provided by the present invention also comprises electrolytic manganese which functions as a deoxidizer and scavenger and is also an alloy which is added to provide strength.

Calcium carbonate in the amount of 4 to 7 percent is added to the ingredients and it acts (1) to decompose and form $CO_2$ which in turn shields the arc, and (2) it forms calcium oxide which increases the alkalinity of the slag. As previously indicated, it is desirable to have the slag either of a basic or approximately neutral pH factor, as opposed to an acidity factor as conventional electrodes produce.

As previously indicated, a certain amount of nickel is used in the ingredient and although the amount is not critical, I have found that a percentage of about 1 to 3.5 is desirable for a low tensile strength weld, while up to 10 percent of nickel can be utilized for high tensile strength weld metal. The use of nickel in the flux provides, as far as I am aware, a reduction in the solubility of nitrogen and other strength raisers in the weld metal. It is believed that the nickel serves as a catalyst to reduce the solubility of the nitrogen which in turn holds the formation of nitrides down to a value of below .025 percent. It is known in the art that nitrides are particularly harmful to the weld metal because they make it brittle. Thus by retarding or minimizing the solubility of nitrogen, the formation of the poisonous nitrides is inhibited.

Referring again to the percentage proportion of the ingredients, if the electrode metal comprised of both the tube and the iron powder in with the other ingredients are considered together, then the percentage would be approximately one-fourth of those percentage amounts expressed previously, because the electrode metal in the tube is preferably about 75% of the total weight of the electrode.

In the electrode provided by the present invention it is desirable to hold the carbon content down to $\frac{1}{10}$ of 1% of the total electrode metal. As previously indicated the present electrode also has an alkalizing effect and this fact together with the low carbon content provides that the metal is transferred in large globular form as opposed to a spray type transfer. This has a decided advantage in that a minimum amount of area of the metal is exposed to the oxygen and nitrogen during transfer. It is believed that the combination of the alkalizing effect and the low carbon content forms high surface tension of the metal which contributes to the formation of large globules during transfer. As a result a particularly sound and good weld is formed with the electrode of the present invention.

SUMMARY

With the electrode provided by the present invention, the nitrides in the weld metal are held below a value of .025 percent and this is accomplished by several factors, for example, (1) the nickel reduces the solubility of the nitrogen, (2) elemental titanium is produced which also serves as a nitrogen absorber, (3) the slag is on the neutral or basic pH side, (4) sufficient $CO_2$ is formed which effectively and efficiently shields the nitrogen from the weld metal, and (5) transfer of metal in efficient globular form occurs, minimizing the tendency to absorb nitrogen or oxygen.

The flux provided by the present invention is properly balanced with essential elements and insures maximum cleansing action of the weld metal, and also produces a heavy protecting slag of composition similar to that of a high quality, low hydrogen manual arc electrode. This slag is easily removed with normal hand tools. In addition, no external gas shielding is required with the improved electrode, but instead sufficient gas forming ingredients are used in the flux to effect a satisfactory shielding from the atmosphere. The combination of fluxing ingredients used along with some nickel powder metal results in an unusual function of the nickel, namely that a reduction of solubility of nitrogen and other strength raisers in the weld metal, to cause a reduction in its tensile and yield strength, the reduction being more than enough to offset the ferrite strengthening effect of the nickel itself.

Various modes of carrying out the invention are contemplated as being within the scope of the following claims particularly pointing out and distinctly claiming the subject matter which is regarded as the invention.

I claim:

1. An arc welding electrode comprised of a hollow steel tube having an interior filled with the following ingredients as expressed in percentage of the weight of the total ingredients:
   2.3 to 4.5% aluminum and magnesium with approximately equal weights of each,
   2.5 to 4.0% of a calcium-silicon mixture with approximately 60% silicon, 30% calcium, and the balance being impurities,
   15 to 20% calcium fluoride,
   15 to 20% rutile,
   2 to 3.5% electrolytic manganese,
   4 to 7% calcium carbonate,
   1 to 10% nickel, and approximately
   50% iron powder.

2. An arc welding electrode comprised of approximately the following ingredients expressed in percentage of the total weight of the electrode being fed into the arc in any given unit of time:
   .57–1.13% aluminum and magnesium with approximately equal weights of each,
   .625–1.0% of a calcium-silicon mixture with approximately 60% silicon, 30% calcium, and the balance being impurities,
   3.25–5% calcium fluoride,
   3.25–5% rutile, .5–.88% electrolytic manganese,
1–1.75% calcium carbonate,
.5–2.5% nickel, and the balance of the electrode weight consisting of electrode metal in the form of iron powder and a tube in which said powder and ingredients are contained.

3. An arc welding electrode as set forth in claim 2 further characterized in that it produces a deposited weld in which the total carbon content of the said deposited weld is approximately 1/10 of 1% of the total electrode metal, or less.

References Cited

UNITED STATES PATENTS

| 2,855,333 | 10/1958 | Wasserman et al. | 219—146 X |
| 3,177,340 | 4/1965 | Danhier | 219—146 |
| 3,253,950 | 5/1966 | Wasserman et al. | 117—206 |
| 3,272,963 | 9/1966 | Wasserman et al. | 219—146 |

RICHARD M. WOOD, *Primary Examiner.*

BARRY A. STEIN, *Assistant Examiner.*